US012782881B2

(12) United States Patent
Chen et al.

(10) Patent No.: US 12,782,881 B2
(45) Date of Patent: Nov. 3, 2026

(54) METHOD AND APPARATUS FOR MEASURING TIME

(71) Applicant: QUDOOR TECHNOLOGIES INC., Beijing (CN)

(72) Inventors: Liuping Chen, Beijing (CN); Yongsheng Fan, Beijing (CN); Renqing Fu, Beijing (CN); Guofeng Zhang, Beijing (CN); Xiangkui Wan, Beijing (CN); Jian Zhang, Beijing (CN)

(73) Assignee: QUDOOR TECHNOLOGIES INC., Beijing (CN)

( * ) Notice: Subject to any disclaimer, the term of this patent is extended or adjusted under 35 U.S.C. 154(b) by 311 days.

(21) Appl. No.: 18/701,547

(22) PCT Filed: Aug. 30, 2022

(86) PCT No.: PCT/CN2022/115684

§ 371 (c)(1),
(2) Date: Apr. 15, 2024

(87) PCT Pub. No.: WO2023/061071

PCT Pub. Date: Apr. 20, 2023

(65) Prior Publication Data

US 2024/0411273 A1 Dec. 12, 2024

(30) Foreign Application Priority Data

Oct. 15, 2021 (CN) ......................... 202111204433.5

(51) Int. Cl.
*G04F 10/00* (2006.01)
*H04B 10/70* (2013.01)

(52) U.S. Cl.
CPC ............ *G04F 10/005* (2013.01); *H04B 10/70* (2013.01)

(58) Field of Classification Search
CPC .......... H03M 1/50; H03M 1/00; H03M 1/002; H03M 1/12; H03M 1/145; H03M 1/38;
(Continued)

(56) References Cited

U.S. PATENT DOCUMENTS

| | | | | |
|---|---|---|---|---|
| 6,628,276 B1 * | 9/2003 | Elliott | .................... | H04N 5/126 375/376 |
| 7,956,660 B2 * | 6/2011 | Ooshima | ................ | H03K 5/086 327/175 |

(Continued)

FOREIGN PATENT DOCUMENTS

| | | |
|---|---|---|
| CN | 101174833 A | 5/2008 |
| CN | 101375346 A | 2/2009 |

(Continued)

*Primary Examiner* — Linh V Nguyen
(74) *Attorney, Agent, or Firm* — The Sun IP Law

(57) ABSTRACT

A method and apparatus for measuring time, and a programmable controller for a quantum communication device are provided. The method includes: receiving a START signal and a STOP signal; sampling the START signal and the STOP signal by using a same clock to generate a START bit string corresponding to the START signal and a STOP bit string corresponding to the STOP signal; extracting a rising edge of the START signal from the START bit string, and extracting a rising edge of the STOP signal from the STOP bit string; and determining a time interval between the START signal and the STOP signal based on a count of bits between the rising edge of the START signal and the rising edge of the STOP signal and based on a period of the clock.

20 Claims, 4 Drawing Sheets

(58) Field of Classification Search
CPC .......... H03M 1/502; H03M 1/60; H03M 7/30; H03L 7/085; H03L 7/18; H03L 2207/50; H03L 7/08; H03L 7/0812; H03L 7/0814; H03L 7/0816; H03L 7/087; H03L 7/093; H03L 7/099; H03L 7/0991; H03L 7/0992; H03L 7/0995; H03L 7/16; H03K 5/14; H03K 19/0008; H03K 2005/00013; H03K 2005/00019; H03K 21/026; H03K 23/42; H03K 3/017; H03K 3/0315; H03K 3/037; G04F 10/00
USPC .......................... 341/155, 156, 118–120, 166
See application file for complete search history.

(56) References Cited

U.S. PATENT DOCUMENTS

| | | | | |
|---|---|---|---|---|
| 8,031,007 | B2 * | 10/2011 | Chang | H03L 7/0991 331/25 |
| 8,629,694 | B1 * | 1/2014 | Wang | G04F 10/005 327/24 |
| 8,830,110 | B1 * | 9/2014 | Choi | G04F 10/005 341/166 |
| 9,379,714 | B1 * | 6/2016 | Xiu | G04F 10/005 |
| 9,746,832 | B1 * | 8/2017 | Yao | H03M 1/50 |
| 11,381,246 | B2 * | 7/2022 | Oh | G01S 7/4865 |
| 11,398,812 | B1 * | 7/2022 | Bowman | H03K 3/017 |
| 2008/0111720 | A1 * | 5/2008 | Huang | G04F 10/005 341/53 |
| 2020/0174427 | A1 * | 6/2020 | Fujimoto | H03M 1/002 |

FOREIGN PATENT DOCUMENTS

| | | | |
|---|---|---|---|
| CN | 102141772 | A | 8/2011 |
| CN | 102193034 | A | 9/2011 |
| CN | 103676622 | A | 3/2014 |
| CN | 104216279 | A | 12/2014 |
| CN | 105610432 | A | 5/2016 |
| CN | 106338908 | A | 1/2017 |
| CN | 110442012 | A | 11/2019 |
| CN | 110609463 | A | 12/2019 |
| CN | 112486008 | A | 3/2021 |
| CN | 113091897 | A | 7/2021 |
| CN | 113641089 | A | 11/2021 |
| CN | 214756366 | U | 11/2021 |
| JP | 2005283408 | A | 10/2005 |
| JP | 2017063350 | A | 3/2017 |

* cited by examiner

METHOD AND APPARATUS FOR MEASURING TIME

CROSS REFERENCE

This application is a National Stage Filing of the PCT International Application No. PCT/CN2022/115684 filed on Aug. 30, 2022, which claims priority to Chinese Application No. 202111204433.5 filed on Oct. 15, 2021 with China National Intellectual Property Administration, the entirety of which is herein incorporated by reference.

TECHNICAL FIELD

The present disclosure relates to the technical field of time measurement, and in particular, to a method and apparatus for measuring time, and a programmable controller for a quantum communication device.

BACKGROUND

In the related technology, time of arrival of photons is mainly measured by a Time To Digital Converter (TDC) module or a Field Programmable Gate Array (FPGA)-based TDC module. The TDC module usually achieves the measurement of the time of arrival of photons by using a plurality of delay chains arranged inside the TDC module. However, the measured result may experience drift with the change of the delay chains due to temperature changes, so the TDC module needs to correct the measured result with the temperature changes in real time. The correction of the measured result not only consumes a large number of computing resources (such as FPGA resources and Digital Signal Processing (DSP) resources), but also makes it difficult to meet the high-speed running requirements of a system (such as, but not limited to, a quantum communication system).

SUMMARY

In order to solve the above problems, embodiments of the present disclosure provide a method and apparatus for measuring time, and a programmable controller for a quantum communication device.

According to one aspect of the embodiments of the present disclosure, a method for measuring time is provided. The method includes: receiving a START signal and a STOP signal; sampling the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal; extracting a rising edge of the START signal from the START bit string, and extracting a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and determining a time interval between the START signal and the STOP signal based on a count of bits between the rising edge of the START signal and the rising edge of the STOP signal and based on a period of the clock.

According to another aspect of the embodiments of the present disclosure, an apparatus for measuring time is provided. The apparatus includes: a signal receiving unit, configured to receive a START signal and a STOP signal; a bit string generation unit, configured to sample the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal; a rising edge extraction unit, configured to extract a rising edge of the START signal from the START bit string, and extract a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and a time measurement unit, configured to determine a time interval between the START signal and the STOP signal based on a count of bits between the rising edge of the START signal and the rising edge of the STOP signal and based on a period of the clock.

According to another aspect of the embodiments of the present disclosure, a programmable controller for a quantum communication device is provided. The programmable controller is configured to implement the method for measuring time described above.

The method and apparatus for measuring time, and the programmable controller for the quantum communication device provided in the embodiments of the present disclosure can measure, for example, but not limited to, time of a photon arrival signal without setting delay chains and performing complicated operations. The technical solution of the embodiments of the present disclosure not only eliminates a hardware circuit and chip used for an external TDC module and improves the integration and minimization of the device, but also can meet high-speed running requirements of a system (for example, but not limited to, a quantum communication system).

BRIEF DESCRIPTION OF THE DRAWINGS

The above objectives and features of the embodiments of the present disclosure will become clearer through the descriptions in conjunction with accompanying drawings below.

DETAILED DESCRIPTION OF THE EMBODIMENTS

The embodiments of the present disclosure will be described in more detail below with reference to the accompanying drawings.

Figure 1:
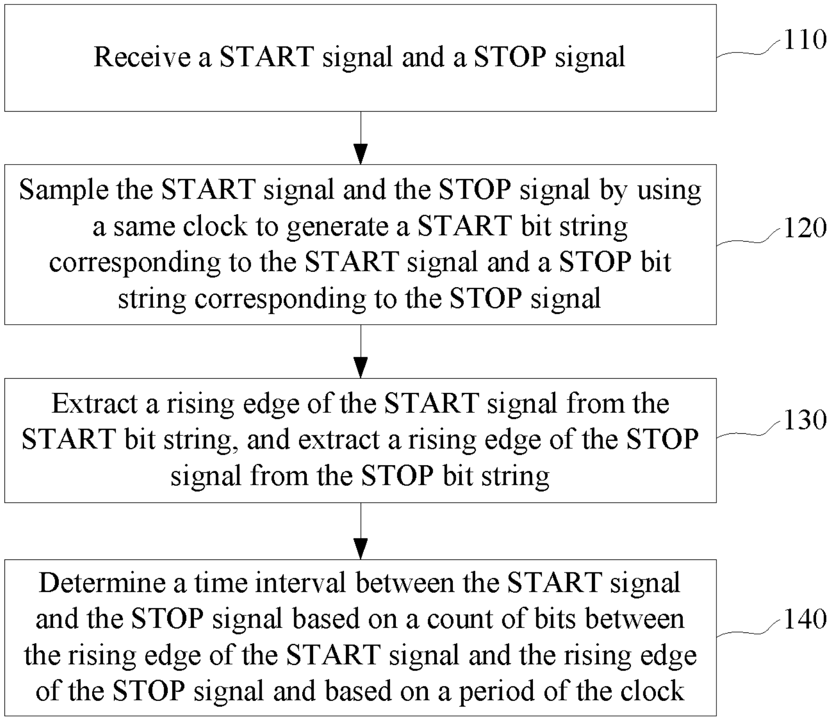
FIG. 1 shows a flowchart of a method for measuring time according to an exemplary embodiment of the present disclosure.

FIG. 1 shows a flowchart of a method for measuring time according to an exemplary embodiment of the present disclosure.

Referring to FIG. 1, a method for measuring time according to an exemplary embodiment of the present disclosure may include the following operations.

At operation 110, a START signal and a STOP signal may be received.

For example, in a quantum communication device (such as a receiving end in a quantum key distribution system), an electrical pulse signal triggered by synchronous light may be received as the START signal, and an electrical pulse signal triggered by signal light may be received as the STOP signal. However, the present disclosure is not limited to this. As needed, electrical pulse signals triggered by other optical signals or other electrical pulse signals may also be received as the START signals, and electrical pulse signals triggered by other optical signals or other electrical pulse signals may be received as the STOP signals.

At operation 120, the START signal and the STOP signal may be sampled by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal.

For example, the bit value "1" may be used to indicate the high level in the signal, and the bit value "0" may be used to indicate the low level in the signal. However, the present disclosure is not limited to this. For example, as needed, the bit value "0" may be used to indicate the high level in the signal, and the bit value "1" may used to indicate the low level in the signal.

At operation 130, a rising edge of the START signal may be extracted from the START bit string, and a rising edge of the STOP signal may be extracted from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string.

In an example, the START bit string and the STOP bit string may be converted from serial data to multiple sets of parallel data. A set of parallel data, which includes a plurality of consecutive adjacent bits having first bit values, among the multiple sets of parallel data is processed into a one-hot code, wherein a significant bit of the one-hot code corresponds to the bit that jumps from the second bit value to the first bit value in the bit string; and the significant bit of the one-hot code in the START bit string is extracted as the rising edge of the START signal, and the significant bit of the one-hot code in the STOP bit string is extracted as the rising edge of the STOP signal.

Figure 2:
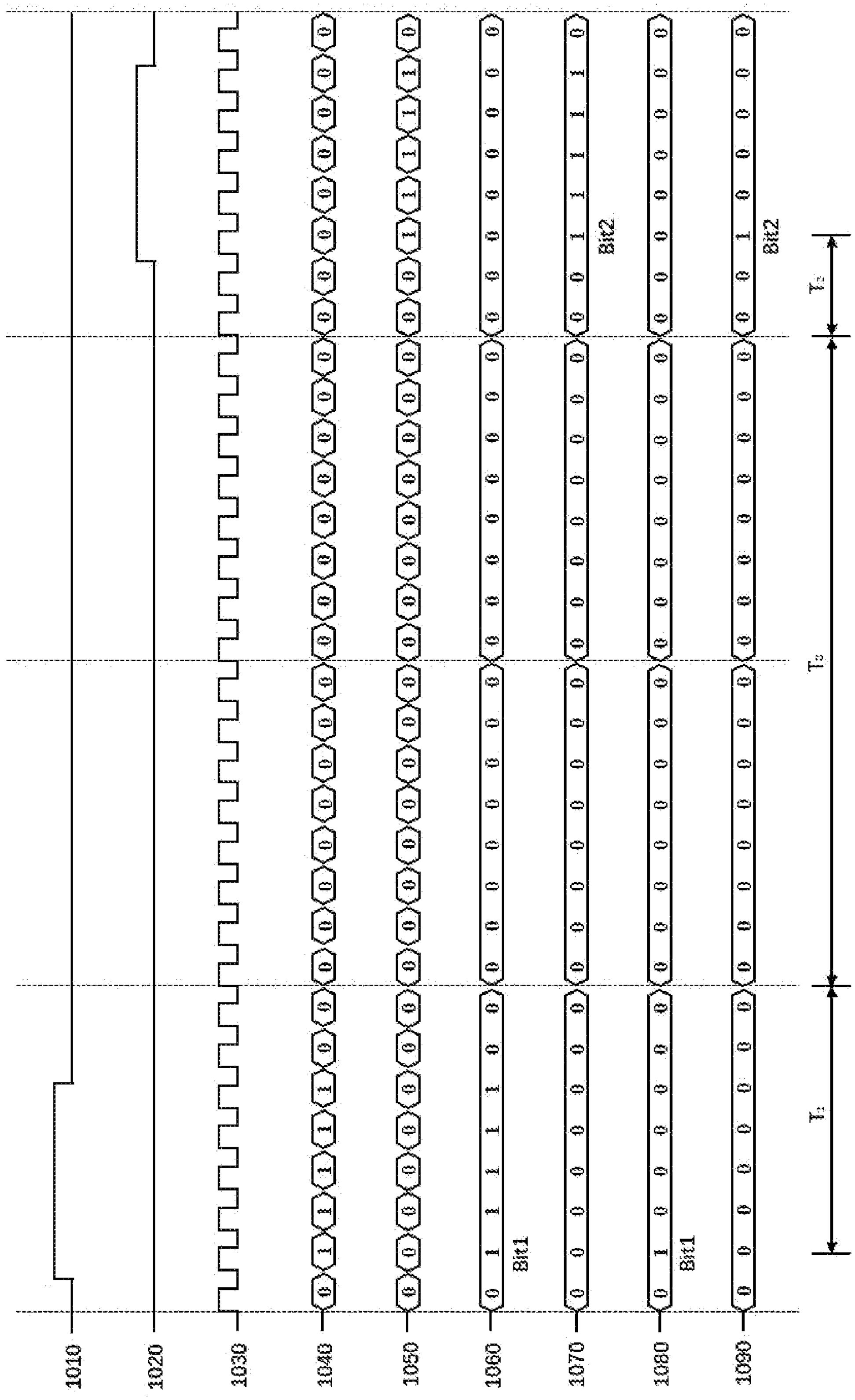
FIG. 2 shows a schematic diagram of extracting a rising edge of a START signal and a rising edge of a STOP signal from bit strings according to an exemplary embodiment of the present disclosure.

FIG. 2 shows a schematic diagram of extracting a rising edge of a START signal and a rising edge of a STOP signal from bit strings according to an exemplary embodiment of the present disclosure.

Referring to FIG. 2, the signal shown in the first row is START signal 1010; the signal shown in the second row is STOP signal 1020; the signal shown in the third row is clock 1030; bit strings shown in the fourth and fifth rows are respectively serial data 1040 that is generated by sampling (namely, performing "AND" operation with) START signal 1010 based on a rising edge of clock 1030 and corresponds to START signal 1010 and serial data 1050 that is generated by sampling STOP signal 1020 based on the rising edge of clock 1030 and corresponds to STOP signal 1020; bit strings shown in the sixth and seventh rows are respectively multiple sets of parallel data 1060 generated by performing serial-to-parallel conversion on serial data 1040 according to a bit width of 8 bits and multiple sets of parallel data 1070 generated by performing serial-to-parallel conversion on serial data 1050 according to a bit width of 8 bits; and bit strings shown in the eighth and ninth rows are respectively multiple sets of parallel data 1080 generated by processing a plurality of consecutive adjacent bits "1" in the multiple sets of parallel data 1060 into a one-hot code Bit1 and multiple sets of parallel data 1090 generated by processing a plurality of consecutive adjacent bits "1" in the multiple sets of parallel data 1070 into a one-hot code Bit2 (that is, maintaining the bit values on Bit1 and Bit2, which jump from the bit value "0" to the bit value "1", in the parallel data unchanged, while setting bit values "1" on the other bits in the parallel data to be "0"). Based on the above serial-to-parallel conversion and the one-hot code processing, the one-hot code Bit1 may be extracted from parallel data 1080 as the rising edge of the START signal, and the one-hot code Bit2 may be extracted from parallel data 1090 as the rising edge of the STOP signal.

It should be understood that although FIG. 2 shows an example of converting the bit strings from the serial data to the parallel data according to the bit width of 8 bits, this example is only illustrative, and the present disclosure is not limited to this. As needed, the bit strings may also be converted from the serial data to the parallel data according to bit widths of 16 bits, 32 bits, or 64 bits.

At operation 140, a time interval between the START signal and the STOP signal may be determined based on a count of bits between the rising edge of the START signal and the rising edge of the STOP signal and based on a period of the clock.

In this example, a rough measurement time interval between the START signal and the STOP signal may be calculated according to a count of bits in the set or sets of parallel data included between the set of parallel data where the rising edge of the START signal is located and the set of parallel data where the rising edge of the STOP signal is located, and the period of the clock; a first fine measurement time interval for the rising edge of the START signal may be calculated according to the bit where the rising edge of the START signal is located, and the period of the clock; a second fine measurement time interval for the rising edge of the STOP signal is calculated according to the bit where the rising edge of the STOP signal is located, and the period of the clock; and the rough measurement time interval, the first fine measurement time interval, and the second fine measurement time interval are summed to obtain the time interval between the START signal and the STOP signal.

Referring to FIG. 2 again, $T_0$ is the rough measurement time interval $T_0$ between the START signal and the STOP signal; $T_1$ is the first fine measurement time interval for the rising edge of the START signal; and $T_2$ is the second fine measurement time interval for the rising edge of the STOP signal.

In this example shown in FIG. 2, there are two sets of parallel data included between the set of parallel data where the rising edge of the START signal is located and the set of parallel data where the rising edge of the STOP signal is located. Since there are 8 bits in one set of parallel data, the count of bits included between the set of parallel data where the rising edge of the START signal is located and the set of parallel data where the rising edge of the STOP signal is located is 16. Based on this count, the rough measurement time interval $T_0$ between the START signal and the STOP signal may be calculated as $16\times\tau$, and $\tau$ represents the period of the clock.

In addition, in this example shown in FIG. 2, Bit1 where the rising edge of the START signal is located is in the second bit in the set of parallel data where the rising edge is located. In other words, the count of the bits included between the rising edge of the START signal and a tail end of the set of parallel data where the rising edge is located is 7. Based on this count, the first fine measurement time interval $T_1$ for the rising edge of the START signal may be calculated as $7\times\tau$, and $\tau$ represents the period of the clock.

In addition, in this example shown in FIG. 2, Bit2 where the rising edge of the STOP signal is located is in the third bit in the set of parallel data where the rising edge is located. In other words, the count of the bits included between the rising edge of the STOP signal and a head end of the set of parallel data where the rising edge is located is 3. Based on this count, the second fine measurement time interval $T_2$ for the rising edge of the STOP signal may be calculated as $3\times\tau$, and t represents the period of the clock.

Therefore, in this example shown in FIG. 2, the time interval between the START signal and the STOP signal may be calculated as $16\times\tau+7\times\tau+3\times\tau$.

It should be understood that although FIG. 2 also shows an example for measuring the time interval between the START signal and the STOP signal, this example is only illustrative, and the present disclosure is not limited to this. For example, the time interval between the START signal and the STOP signal may also be calculated by directly counting the count of bits between the rising edge of the START signal and the rising edge of the STOP signal.

Figure 3:
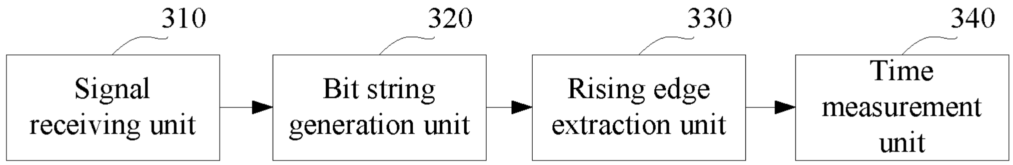
FIG. 3 shows a structural block diagram of an apparatus for measuring time according to an exemplary embodiment of the present disclosure.

FIG. 3 shows a structural block diagram of an apparatus for measuring time according to an exemplary embodiment of the present disclosure.

Referring to FIG. 3, an exemplary apparatus for measuring time according to the present disclosure includes a signal receiving unit 310, a bit string generation unit 320, a rising edge extraction unit 330, and a time measurement unit 340. The signal receiving unit 310 may be configured to receive a START signal and a STOP signal; the bit string generation unit 320 may be configured to sample the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal; the rising edge extraction unit 330 may be configured to extract a rising edge of the START signal from the START bit string, and extract a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and the time measurement unit 340 may be configured to determine a time interval between the START signal and the STOP signal based on a count of bits between the rising edge of the START signal and the rising edge of the STOP signal and based on a period of the clock.

In the apparatus shown in FIG. 3, the rising edge extraction unit 330 may further include a serial-to-parallel conversion unit, a one-hot code processing unit, and a one-hot code extraction unit (not shown). The serial-to-parallel conversion unit may be configured to convert the START bit string from serial data to multiple sets of parallel data, and convert the STOP bit string from serial data to multiple sets of parallel data. The one-hot code processing unit may be configured to process a set of parallel data, which includes a plurality of consecutive adjacent bits having first bit values, among the multiple sets of parallel data into a one-hot code, wherein the one-hot codes may correspond to the bit that jumps from the second bit value to the first bit value in the bit string; and the one-hot code extraction unit may be configured to, according to the one-hot code, extract the rising edge of the START signal from the START bit string, and extract the rising edge of the STOP signal from the STOP bit string. In addition, in this example, a bit width of the parallel data may be 8 bits, 16 bits, 32 bits, or 64 bits. As needed, a proper bit width may be selected to perform the above serial-to-parallel conversion and one-hot code processing.

In the apparatus shown in FIG. 3, the time measurement unit 340 may further include a time rough measurement unit, a first time fine measurement unit, a second time fine measurement unit, and a summing unit (not shown). The time rough measurement unit may be configured to calculate a rough measurement time interval between the START signal and the STOP signal according to a count of bits in the set or sets of parallel data included between the set of parallel data where the rising edge of the START signal is located and the set of parallel data where the rising edge of the STOP signal is located, and the period of the clock; the first time fine measurement unit may be configured to calculate a first fine measurement time interval for the rising edge of the START signal according to the bit where the rising edge of the START signal is located, and the period of the clock; the second time fine measurement unit may be configured to calculate a second fine measurement time interval for the rising edge of the STOP signal according to the bit where the rising edge of the STOP signal is located, and the period of the clock; and the summing unit may be configured to sum the rough measurement time interval, the first fine measurement time interval, and the second fine measurement time interval to obtain the time interval between the START signal and the STOP signal.

Uses of the method and apparatus for measuring time described above in a quantum communication device will be further described in detail with reference to FIG. 4 and FIG. 5.

Figure 4:
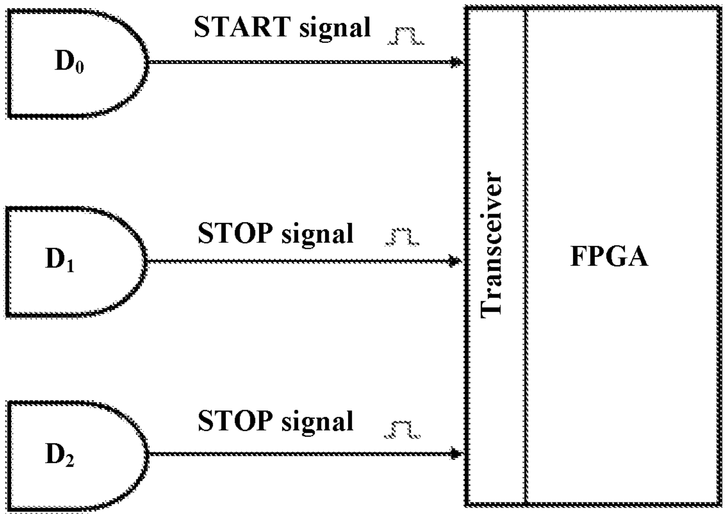
FIG. 4 shows a schematic diagram of measuring time of arrival of photons by a programmable controller in a quantum communication device according to an exemplary embodiment of the present disclosure.

FIG. 4 shows a schematic diagram of measuring time of arrival of photons by a programmable controller in a quantum communication device (such as a receiving end or Bob end in a quantum communication system) according to an exemplary embodiment of the present disclosure. FIG. 5 shows a schematic diagram of a bit string generated by a programmable controller in a quantum communication device according to an exemplary embodiment of the present disclosure.

Figure 5:
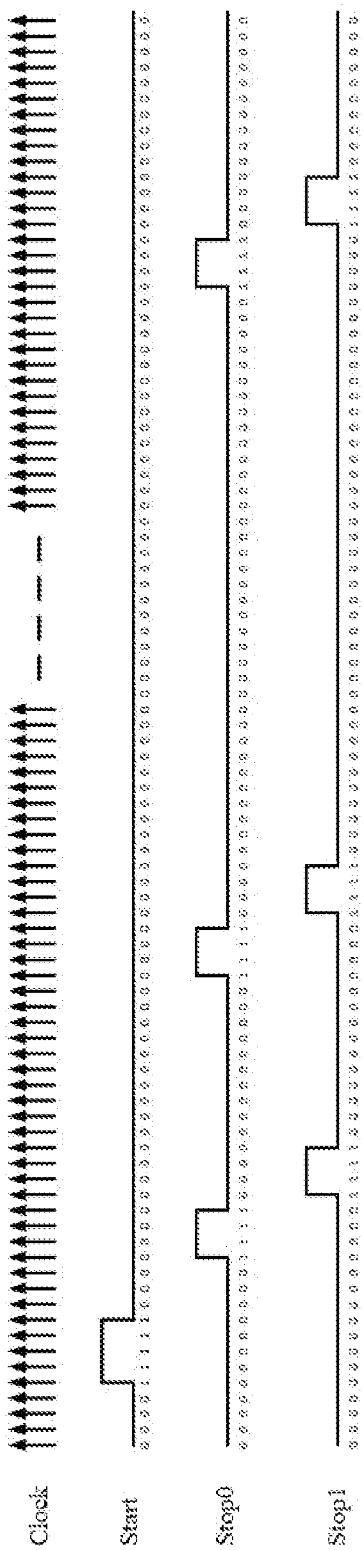
FIG. 5 shows a schematic diagram of a bit string generated by a programmable controller in a quantum communication device according to an exemplary embodiment of the present disclosure.

In the quantum communication device shown in FIG. 4 and FIG. 5, a single photon detector $D_0$ may transmit an electrical pulse signal generated at the arrival of synchronous light as a START signal to the programmable controller FPGA; and a single photon detector $D_1$ may transmit an electrical pulse signal generated at the arrival of signal light as a STOP signal to the programmable controller FPGA. In addition, a single photon detector $D_2$ may also transmit an electrical pulse signal generated at the arrival of signal light as a STOP signal to the programmable controller FPGA. The programmable controller FPGA may be configured to receive the START signal and the STOP signals through a transceiver arranged in the programmable controller, and then sample the START signal and the STOP signals by using the same Clock through a serial-to-parallel conversion module SIPO (not shown) in the transceiver to generate a bit string Start corresponding to the START signal and bit strings Stop0 and Stop1 corresponding to the STOP signals from the single photon detector $D_1$ and single photon detector $D_2$. In the bit strings, the bit value "1" is used to indicate a high level in the signal, and the bit value "0" is used to indicate a low level in the signal. Furthermore, each of the generated bit strings is converted from serial data to multiple sets of parallel data. Further, the programmable controller FPGA may also be configured to process a plurality of consecutive adjacent bits "1" in the parallel data into a one-hot code to extract the rising edge of the START signal and the rising edge of each STOP signal from the aforementioned bit strings; and determine, using the foregoing method, a time interval between the START signal and each STOP signal according to a count of bits between the rising edge of the START signal and the rising edge of each STOP signal and based on a period of the Clock.

It should be understood that although FIG. 4 and FIG. 5 show the examples of measuring the photon arrival time in the quantum communication device, the present disclosure is not limited to this. The above method and apparatus for measuring time may also be used to measure time between signals in other devices or systems.

It may be seen that the method and apparatus for measuring time according to the exemplary embodiments of the present disclosure may measure, for example, but not limited to, time of a photon arrival signal without setting delay chains and performing complicated operations. The technical solution of the embodiments of the present disclosure not only eliminates a hardware circuit and chip used for an external TDC module and improves the integration and minimization of the device, but also may meet high-speed running requirements of a system (for example, but not limited to, the quantum communication system).

Although the present application has been represented and described with reference to the preferred embodiments, those having ordinary skill in the art should understand that various modifications and transformations may be made to these embodiments without departing from the spirit and scope of the present application as defined by the claims.

What is claimed is:

1. A method for measuring time, the method comprising:
- receiving a START signal and a STOP signal;
- sampling the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal;
- extracting a rising edge of the START signal from the START bit string, and extracting a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and
- determining a time interval between the START signal and the STOP signal based on a count of bits between the rising edge of the START signal and the rising edge of the STOP signal and based on a period of the clock.

2. The method according to claim 1, wherein extracting a rising edge of the START signal from the START bit string, and extracting a rising edge of the STOP signal from the STOP bit string comprises:
- converting the START bit string from serial data to multiple sets of parallel data, and converting the STOP bit string from serial data to multiple sets of parallel data;
- processing a set of parallel data, which comprises a plurality of consecutive adjacent bits having first bit values, among the multiple sets of parallel data into a one-hot code, wherein a significant bit of the one-hot code corresponds to the bit that jumps from the second bit value to the first bit value in the bit string; and
- extracting the significant bit of the one-hot code in the START bit string as the rising edge of the START signal, and extracting the significant bit of the one-hot code in the STOP bit string as the rising edge of the STOP signal.

3. The method according to claim 2, wherein determining a time interval between the START signal and the STOP signal based on a count of bits between the rising edge of the START signal and the rising edge of the STOP signal and based on a period of the clock comprises:
- calculating a rough measurement time interval between the START signal and the STOP signal according to a count of bits in the set or sets of parallel data included between the set of parallel data where the rising edge of the START signal is located and the set of parallel data where the rising edge of the STOP signal is located, and the period of the clock;
- calculating a first fine measurement time interval for the rising edge of the START signal according to the bit where the rising edge of the START signal is located, and the period of the clock;
- calculating a second fine measurement time interval for the rising edge of the STOP signal according to the bit where the rising edge of the STOP signal is located, and the period of the clock; and
- summing the rough measurement time interval, the first fine measurement time interval, and the second fine measurement time interval to obtain the time interval between the START signal and the STOP signal.

4. The method according to claim 2, wherein a bit width of the parallel data is one of 8 bits, 16 bits, 32 bits, or 64 bits.

5. The method according to claim 1, wherein the first bit value is 1, and the second bit value is 0; or the first bit value is 0, and the second bit value is 1.

6. An apparatus for measuring time, the apparatus comprising a processor configured to:
- receive a START signal and a STOP signal;
- sample the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal;

extract a rising edge of the START signal from the START bit string, and extract a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and determine a time interval between the START signal and the STOP signal based on a count of bits between the rising edge of the START signal and the rising edge of the STOP signal and based on a period of the clock.

7. The apparatus according to claim 6, wherein the processor, when being configured to extract a rising edge of the START signal from the START bit string, and extract a rising edge of the STOP signal from the STOP bit string, is configured to:

convert the START bit string from serial data to multiple sets of parallel data, and convert the STOP bit string from serial data to multiple sets of parallel data;

process a set of parallel data, which comprises a plurality of consecutive adjacent bits having first bit values, among the multiple sets of parallel data into a one-hot code, wherein a significant bit of the one-hot code corresponds to the bit that jumps from the second bit value to the first bit value in the bit string; and extract the significant bit of the one-hot code in the START bit string as the rising edge of the START signal, and extract the significant bit of the one-hot code in the STOP bit string as the rising edge of the STOP signal.

8. The apparatus according to claim 7, wherein the processor, when being configured to determine a time interval between the START signal and the STOP signal based on a count of bits between the rising edge of the START signal and the rising edge of the STOP signal and based on a period of the clock, is configured to:

calculate a rough measurement time interval between the START signal and the STOP signal according to a count of bits in the set or sets of parallel data included between the set of parallel data where the rising edge of the START signal is located and the set of parallel data where the rising edge of the STOP signal is located, and the period of the clock;

calculate a first fine measurement time interval for the rising edge of the START signal according to the bit where the rising edge of the START signal is located, and the period of the clock;

calculate a second fine measurement time interval for the rising edge of the STOP signal according to the bit where the rising edge of the STOP signal is located, and the period of the clock; and sum the rough measurement time interval, the first fine measurement time interval, and the second fine measurement time interval to obtain the time interval between the START signal and the STOP signal.

9. The apparatus according to claim 7, wherein a bit width of the parallel data is one of 8 bits, 16 bits, 32 bits, or 64 bits.

10. The apparatus according to claim 6, wherein the first bit value is 1, and the second bit value is 0; or the first bit value is 0, and the second bit value is 1.

11. A programmable controller for a quantum communication device, wherein the programmable controller is configured to perform the following operations:

receiving a START signal and a STOP signal;

sampling the START signal and the STOP signal by using a same clock to generate a START bit string corresponding to the START signal and a STOP bit string corresponding to the STOP signal, wherein a first bit value of respective bit in the bit string is used to indicate a high level in the signal, and a second bit value of the respective bit in the bit string is used to indicate a low level in the signal;

extracting a rising edge of the START signal from the START bit string, and extracting a rising edge of the STOP signal from the STOP bit string, wherein the rising edge of the START signal corresponds to a bit that jumps from the second bit value to the first bit value in the START bit string, and the rising edge of the STOP signal corresponds to a bit that jumps from the second bit value to the first bit value in the STOP bit string; and determining a time interval between the START signal and the STOP signal based on a count of bits between the rising edge of the START signal and the rising edge of the STOP signal and based on a period of the clock.

12. The method according to claim 1, wherein an electrical pulse signal triggered by synchronous light is received as the START signal in a quantum communication device, and an electrical pulse signal triggered by signal light is received as the STOP signal in the quantum communication device.

13. The method according to claim 2, wherein processing a set of parallel data, which comprises a plurality of consecutive adjacent bits having first bit values, among the multiple sets of parallel data into a one-hot code comprises;

maintaining the bit value of the bit, that jumps from the second bit value to the first bit value, in the set of parallel data unchanged, and setting bit values of the other bits in the set of parallel data to the second bit value, so as to obtain the one-hot code.

14. The method according to claim 1, wherein determining a time interval between the START signal and the STOP signal based on a count of bits between the rising edge of the START signal and the rising edge of the STOP signal and based on a period of the clock comprises:

calculating the time interval between the START signal and the STOP signal by directly counting the count of bits between the rising edge of the START signal and the rising edge of the STOP signal.

15. The apparatus according to claim 6, wherein the apparatus is a quantum communication device, and the processor is configured to receive an electrical pulse signal triggered by synchronous light as the START signal, and receive an electrical pulse signal triggered by signal light as the STOP signal.

16. The apparatus according to claim 7, wherein the processor, when being configured to process a set of parallel data, which comprises a plurality of consecutive adjacent bits having first bit values, among the multiple sets of parallel data into a one-hot code, is configured to;

maintain the bit value of the bit, that jumps from the second bit value to the first bit value, in the set of parallel data unchanged, and set bit values of the other bits in the set of parallel data to the second bit value, so as to obtain the one-hot code.

17. The apparatus according to claim 6, wherein the processor, when being configured to determine a time interval between the START signal and the STOP signal based on a count of bits between the rising edge of the START signal and the rising edge of the STOP signal and based on a period of the clock, is configured to:

calculate the time interval between the START signal and the STOP signal by directly counting the count of bits between the rising edge of the START signal and the rising edge of the STOP signal.

18. The programmable controller according to claim 11, wherein the programmable controller is configured to receive the START signal and the STOP signal through a transceiver arranged in the programmable controller.

19. The programmable controller according to claim 11, wherein the programmable controller is configured to sample the START signal and the STOP signal by using the same clock through a serial-to-parallel conversion module SIPO in a transceiver arranged in the programmable controller.

20. The programmable controller according to claim 11, wherein the STOP signal comprises a first STOP signal and a second STOP signal, and the STOP bit string corresponding to the STOP signal comprises a first STOP bit string corresponding to the first STOP signal and a second STOP bit string corresponding to the second STOP signal.

* * * * *